United States Patent

[11] 3,601,619

| [72] | Inventor | Ralph H. Ringstad<br>Whippany, N.J. |
|---|---|---|
| [21] | Appl. No. | 881,796 |
| [22] | Filed | Dec. 3, 1969 |
| [45] | Patented | Aug. 24, 1971 |
| [73] | Assignee | Automatic Switch Co. |

[54] AUTOMATIC SYNCHRONIZING MONITOR FOR PARALLEL CONNECTION OF TWO SEPARATE ALTERNATING-CURRENT SOURCES
19 Claims, 32 Drawing Figs.

| [52] | U.S. Cl. | 307/87 |
|---|---|---|
| [51] | Int. Cl. | H02j 3/42 |
| [50] | Field of Search | 307/87 |

[56] References Cited
UNITED STATES PATENTS

| 3,069,556 | 12/1962 | Apfelbeck et al. | 307/87 |
|---|---|---|---|
| 3,325,650 | 6/1967 | Barnes | 307/87 X |
| 3,343,001 | 9/1967 | Grimsdale | 307/87 |
| 3,399,310 | 8/1968 | Vogler et al. | 307/87 X |
| 3,428,821 | 2/1969 | Ruffienx | 307/87 |
| 3,466,456 | 9/1969 | Tolworthy | 307/87 |
| 3,491,248 | 1/1970 | Beckwith et al. | 307/87 |
| 3,493,778 | 2/1970 | Cutler et al. | 307/87 |

*Primary Examiner*—David Smith, Jr.
*Assistant Examiner*—William J. Smith
*Attorney*—Breitenfeld & Levine ABSTRACT: An automatic synchronizing monitor enabling the connection of two separate alternating-current sources in parallel and, more particularly, to permit parallel connection of the alternating-current sources when the phase angle, frequency, and voltage of the sources are substantially equal to one another and within predetermined limits so as to limit the resultant disturbance on a common bus to an absolute minimum when the paralleling takes place.

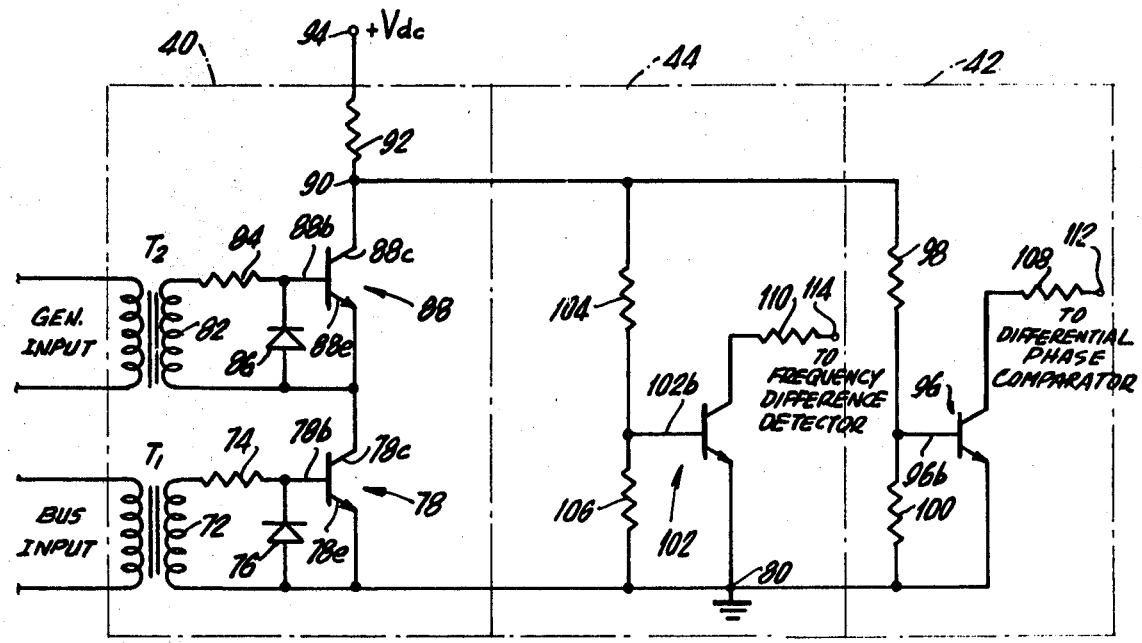
FIG.2
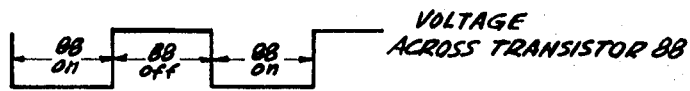
FIG.2a — VOLTAGE ACROSS TRANSISTOR 88
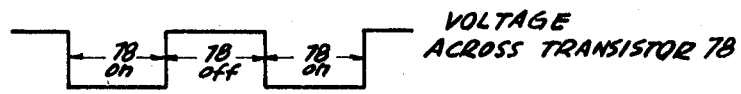
FIG.2b — VOLTAGE ACROSS TRANSISTOR 78
FIG.2c — VOLTAGE ACROSS "AND" GATE 40
FIG.2d — OUTPUT OF INVERTER 42
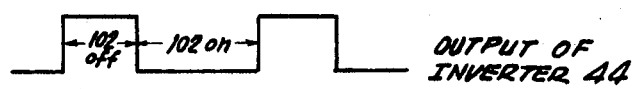
FIG.2e — OUTPUT OF INVERTER 44
INVENTOR:
RALPH H. RINGSTAD
BY
Breitenfeld & Levine
ATTORNEYS

INVENTOR:
RALPH H. RINGSTAD

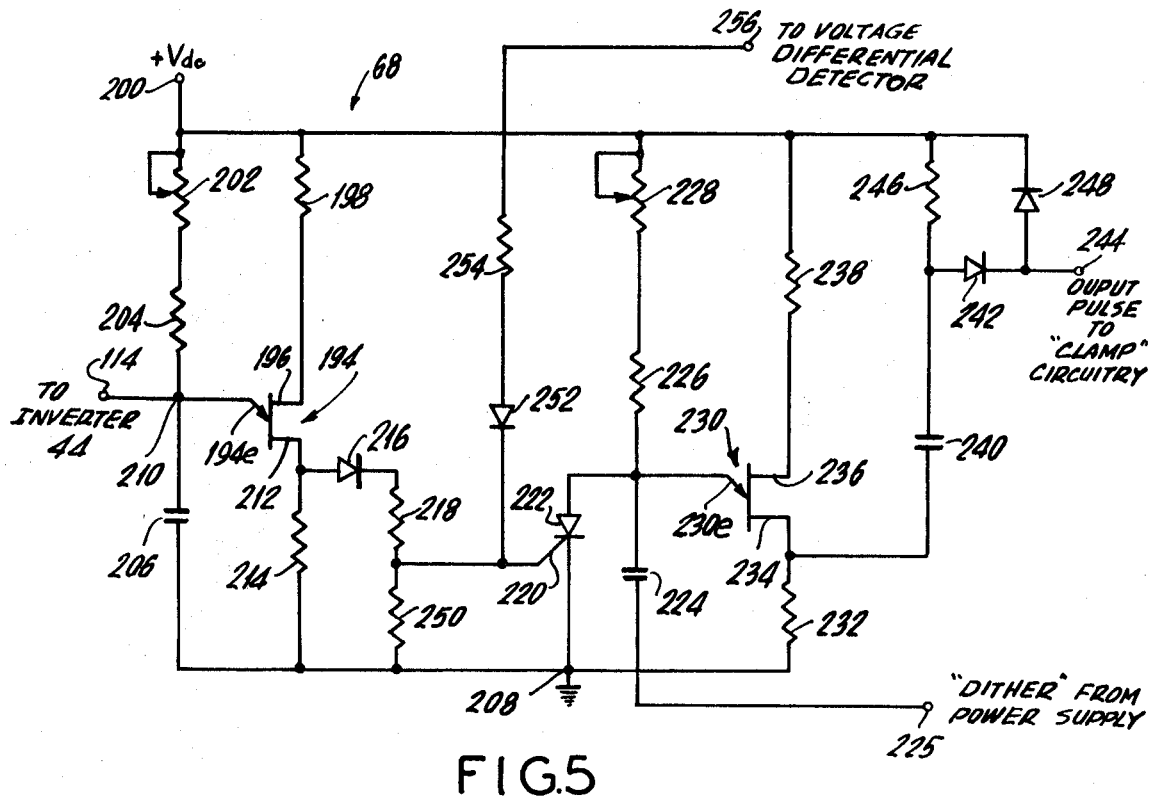
FIG.5
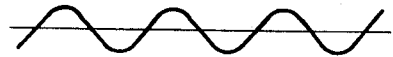
HIGH DIFFERENCE FREQUENCY
FIG.5a
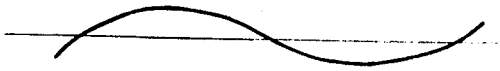
LOW DIFFERENCE FREQUENCY
FIG.5e
PULSE OUTPUT OF TRANSISTOR 194
FIG.5b
PULSE OUTPUT OF TRANSISTOR 194 (LOW fo)
FIG.5f
CHARGING VOLTAGE ACROSS CAPACITOR 224
FIG.5c
OUTPUT PULSE OF TRANSISTOR 230
FIG.5d
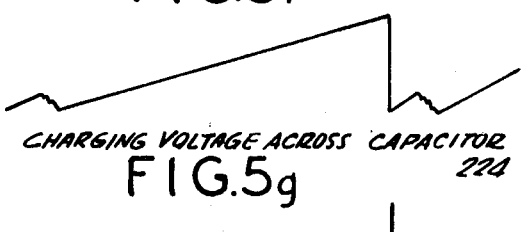
CHARGING VOLTAGE ACROSS CAPACITOR 224
FIG.5g
OUTPUT PULSE OF TRANSISTOR 230
FIG.5h
INVENTOR:
RALPH H. RINGSTAD
BY
Breitenfeld & Levine
ATTORNEYS

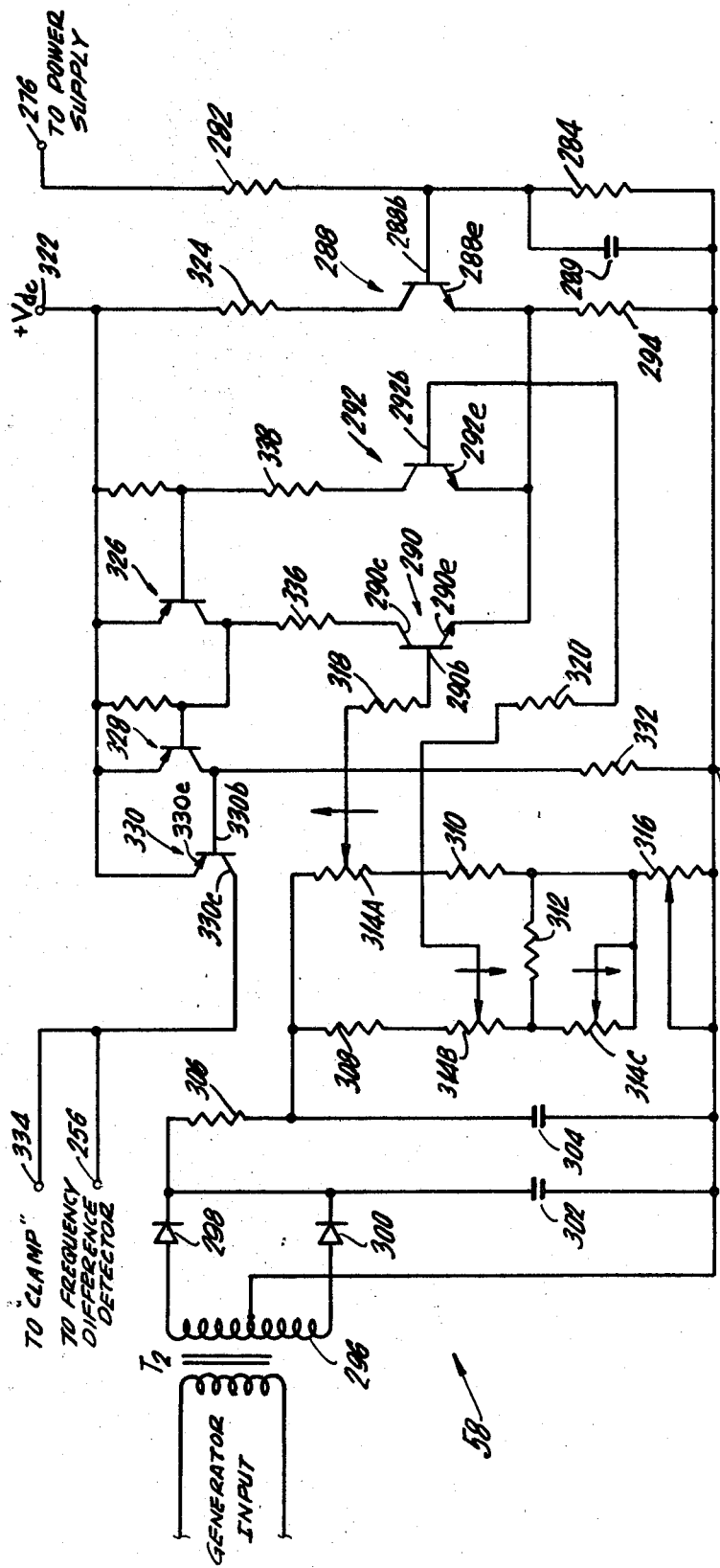

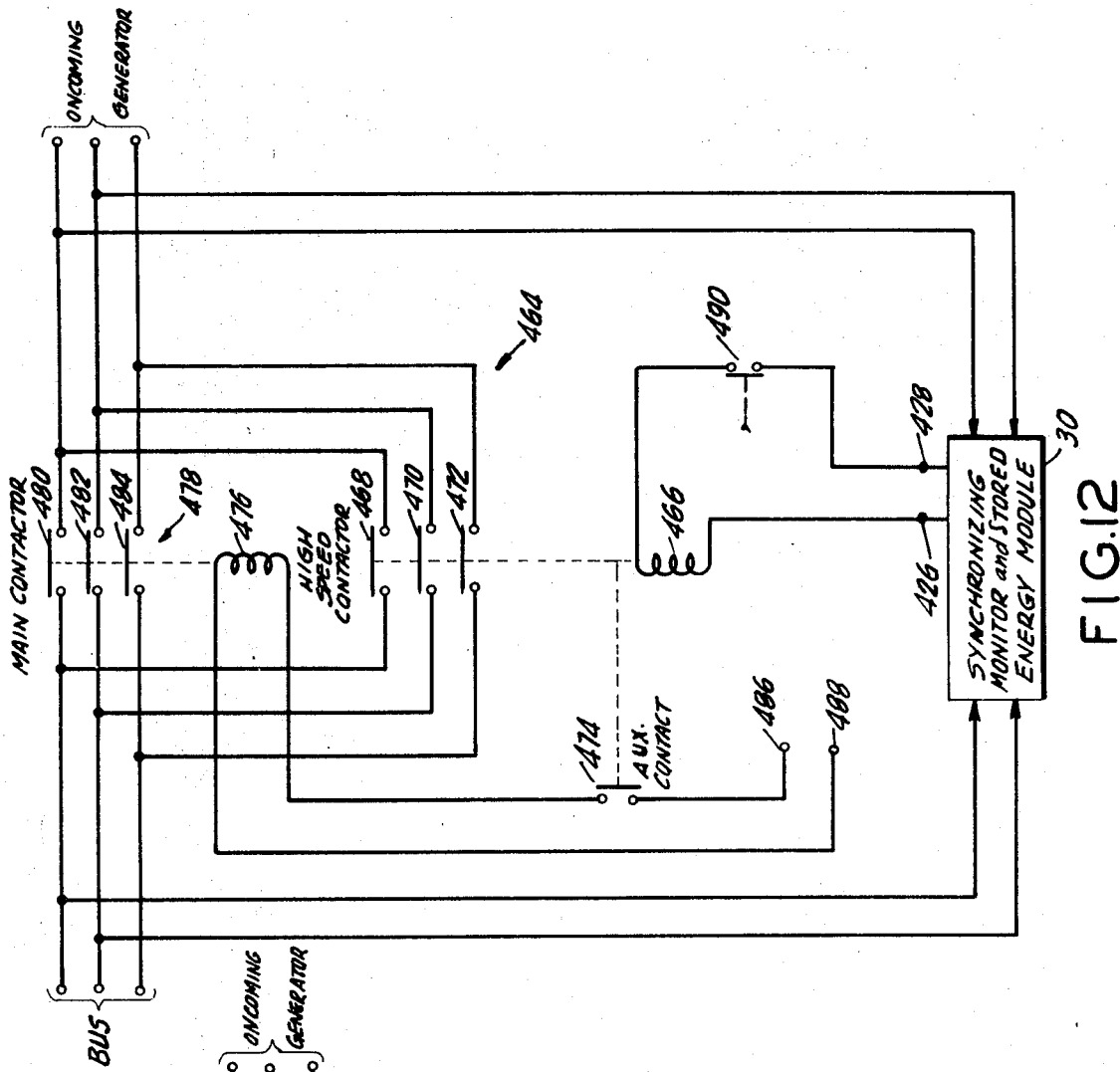
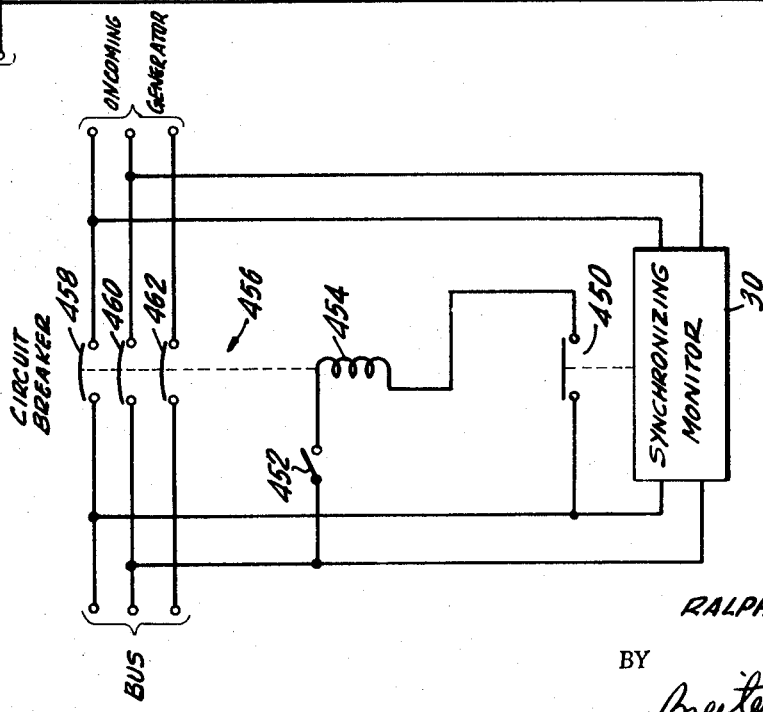

AUTOMATIC SYNCHRONIZING MONITOR FOR PARALLEL CONNECTION OF TWO SEPARATE ALTERNATING-CURRENT SOURCES

The present invention relates generally to alternating current power generating installations and, more particularly, to an automatic synchronizing monitor to enable the parallel connection of a generator to a bus having one or more generators connected to it, when the generator phase, frequency, and voltage are substantially synchronized with those appearing on the bus.

Multigenerator power installations are continually required to operate with a plurality of AC generators (either single phase or polyphase) connected in parallel so as to enable the entire output production to be supplied through a single bus line or bus. The connection of two or more generators in parallel provides certain inherent problems. In particular, the phase, frequency, and voltage deviation between the voltages of the separate generators must be synchronized as closely as possible with respect to one another, so that at the precise time of switching the generators into parallel operation the disturbances on the common bus will be held to a minimum, to thereby produce little or no disturbance on the bus.

Prior art methods for parallel connection of separate generators have been, for the most part, concerned with the relative phase angle between the sources. A recent development, in this regard, is the "synchroscope" which directly measures the phase angle deviation between two generators and visually displays the same. However, the prior art methods merely indicate the phase deviation while the actual act of connecting the generators in parallel must be performed manually by an operator upon the observation of the most appropriate phase conditions.

A primary problem encountered with almost all present-day automatic synchronizing systems is their inability to take into consideration the effects of contactor closure time. In other words, although a signal is given to connect two generators in parallel at a time when they are in phase with each other, there is no assurance that when the contactor finally closes, the generators will have no phase deviation between them. Thus, if a frequency difference exists between the two generators, a signal to close the contactor given at a time when the phase deviation is 0°, will result in the closing of the contactor at a time when the generators have a phase deviation between them other than 0°.

The connection of two generators in parallel is not only dependent upon contactor closure time but also upon frequency deviation. Moreover, many of the present-day synchronization systems exhibit an interdependence of phase, frequency, and voltage difference. That is, the point at which a signal is generated with respect to phase can be affected by variations in voltage and frequency between the two generators, which causes the contactor to close at varying and different phase angles, thereby limiting the usefulness of these synchronizing systems as paralleling devices.

Accordingly, it is the primary object of the present invention to provide an automatic synchronizing monitor to permit the parallel connection of two separate AC sources.

It is another object of the present invention to provide an automatic synchronizing monitor which provides a signal to a contactor-activating means prior to synchronism between two separate AC sources to be paralleled. The timing is such that the contactor closes to connect the sources for parallel operation at a time when the sources are effectively synchronized with each other.

It is a further object of the present invention to provide an automatic synchronizing monitor of the aforementioned type wherein only a single pulse or signal is supplied to the contactor activating means.

It is yet another object of the present invention to provide an automatic synchronizing monitor of the aforementioned type wherein the single pulse is produced only when the phase, frequency, and voltage deviation between the two sources are within preselected limits.

It is a further object of the present invention to provide an automatic synchronizing monitor of the type described, wherein the single pulse is produced in advance of the true in-phase condition of the two sources. This allows for contactor closure time, so that closure and paralleling of the two sources occurs when they are substantially in phase alignment, and the voltage and frequency deviation between the sources are within predetermined limits.

The foregoing and other objects features and advantages of the present invention will become more apparent from the detailed description which follows, considered in conjunction with the accompanying drawings.

In the drawings:

FIG. 2 is a schematic representation of the input AND gate and inverter circuits depicted in block form in FIG. 1;

FIGS. 2a through 2e are illustrations of the voltage waveforms appearing at various points of the circuit of FIG. 2;

FIGS. 3a through 3e are illustrations of the voltage waveforms appearing at various points in the circuit of FIG. 3;

FIG. 5 is a schematic representation of the frequency difference detector circuit of FIG. 1;

FIGS. 5a through 5h are illustrations of the voltage waveforms appearing at various points in the circuit of FIG. 5 when there is a high frequency difference between the generators (FIGS. 5a–5d) and a low frequency difference between the generators (FIGS. 5e–5h);

FIG. 7 is a schematic representation of the voltage difference detector of FIG. 1;

FIGS. 7a and 7b illustrate the relationship between the voltage difference between the two generators and the inhibit signal;

FIG. 10 is a schematic representation of the stored energy module of FIG. 1;

FIG. 11 illustrates the synchronizing monitor of the present invention associated with a relay-operated circuit breaker; and FIG. 12 illustrates the synchronizing monitor of the present invention associated with a high speed contactor.

Figure 1:
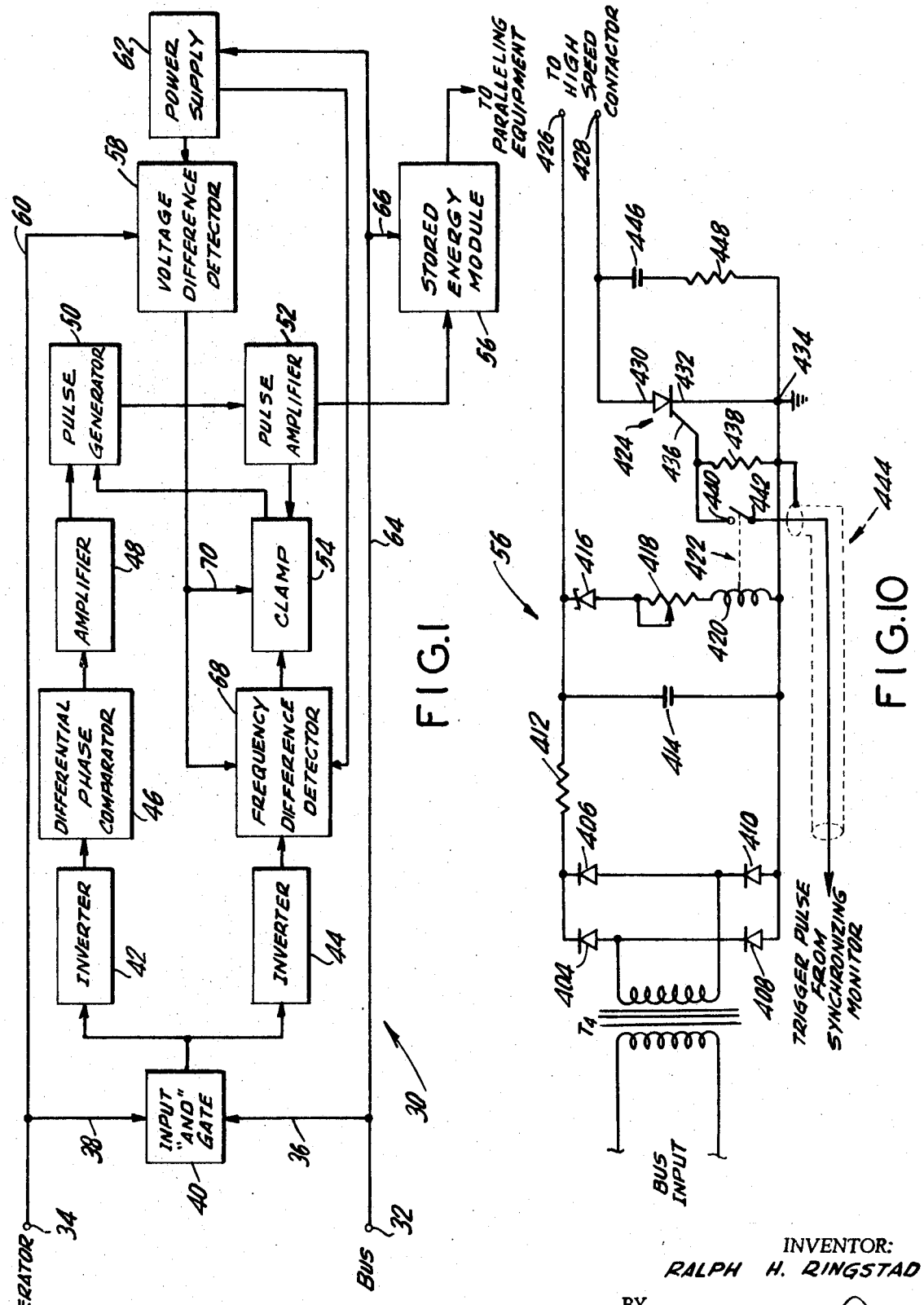
FIG. 1 is a block diagram illustrating the component parts of the automatic synchronizing monitor of the present invention.

Referring now to the drawings, FIG. 1 shows a block diagram of an automatic synchronizing monitor constructed in accordance with the principles of the present invention and designated generally by the reference numeral 30. The bus is connected to a terminal 32 and the generator, which is to be connected in parallel with the bus, is connected to a terminal 34. The inputs appearing at terminals 32 and 34 are fed via lead lines 36 and 38, respectively, to an input AND gate 40. The output from the gate 40 is fed to two inverters 42 and 44. The output from inverter 42 is applied to a differential phase comparator 46, the output of which is fed to an amplifier 48. The amplifier output is fed to a pulse generator 50 whose output is, in turn, fed to a pulse amplifier 52. The output of the pulse amplifier 52 is connected to a clamp circuit 54 and also to a stored energy module designated 56 which is connected to a contactor, or other paralleling equipment.

The terminal 34 is also connected to a voltage difference detector 58 via a lead line 60 while the terminal 32 is connected to a power supply 62 via a lead line 64. The bus voltage appearing on line 64 is also supplied to the stored energy module 56 by means of a lead 66.

The output from the inverter 44 is fed to a frequency difference detector 68 which also receives an input signal from the voltage difference detector 58 and is connected to the power supply 62. The output of the frequency difference detector is fed to the clamp circuit 54 which also receives an input signal from the voltage difference detector 58 via lead line 70. The output of the clamp circuit 54 is fed to the pulse generator 50 as the second input thereto.

In the operation of the monitor 30, the bus and generator voltages are supplied to the input AND gate 40 and the output thereof is fed to both inverters 42 and 44. The output of inverter 42 fed to the differential phase comparator 46 produces an output signal from the latter when a predetermined phase relationship exists between the generator and bus voltages. This output signal is fed to amplifier 48 and the amplified signal is presented to the pulse generator 50 but is in itself insufficient to activate the pulse generator.

The generator voltage is fed from terminal 34 via lead line 60 to the voltage difference detector 58 and the bus voltage is supplied to the detector 58 via the power supply 62. When the difference between the amplitudes of the generator and bus voltages is within prescribed limits, an enabling output is fed from detector 58 to both the clamp circuit 54 and the frequency difference detector 68. The latter then compares the frequency difference between the bus and generator voltages, and if this difference is within prescribed limits an enabling output is fed from the detector 68 to the clamp circuit 54.

If enabling outputs from detectors 58 and 68 appear at the clamp circuit 54, thereby signifying that the amplitude and frequency relationship of the bus and generator voltages are within the prescribed limits, the clamp circuit 54 will become unlatched and will no longer supply a signal which serves as an inhibit signal, to the pulse generator 50. Thus, the next succeeding pulse supplied to the pulse generator 50 by the amplifier 48, signifying that the phase relationship between the bus and generator voltages is within the predescribed limits, will activate the pulse generator 50 to cause an output signal therefrom to be fed to the pulse amplifier 52. In response, the pulse amplifier sends a signal to the stored energy module 56 to energize the contactor or other means provided for connecting the generator in parallel with the bus. Upon activation of the pulse amplifier 52, a signal is fed to clamp circuit 54 to again cause latching operation of the latter, whereby an inhibit signal is again applied to the pulse generator 50 to inhibit its operation.

Having thus described the operation of the automatic synchronizing monitor 30, reference will now be made to the individual circuit components of the monitor and their mode of operation. FIG. 2 depicts the input AND gate 40 and inverters 42 and 44. The gate 40 includes transformers $T_1$ and $T_2$. The bus voltage, which may be a 60-Hertz AC voltage, is coupled by the secondary coil 72 of the transformer $T_1$ through a resistor 74 and a rectifying diode 76 to the base 78b of a transistor 78. The emitter 78e of this transistor is connected to a ground terminal 80. The generator voltage, which may be assumed to be substantially a 60-Hertz AC voltage, is coupled by the secondary 82 of the transformer $T_2$ through a resistor 84 and a rectifying diode 86 to the base 88b of a transistor 88. The emitter 88e of this transistor is connected to collector 78c, and its collector 88c is connected to a junction 90 which is connected via a resistor 92 to a DC voltage source 94.

The inverter 42 includes a transistor 96 whose base 96b is connected between the series resistors 98 and 100, the latter serving as a base stabilization resistor for transistor 96. Similarly, the inverter 44, the input of which is connected in parallel with the input of inverter 42, includes a transistor 102, the base 102b of which is connected between the series resistors 104 and 106.

The generator and bus voltages applied to the primary coils of transformers $T_2$ and $T_1$, respectively, are sinusoidal. Also, the transistors 88 and 78 are in essence overdriven amplifiers. Thus, the outputs of the transistors are square waves, as illustrated in FIGS. 2a and 2b, respectively. The illustrated waveform depicts a situation in which the generator and bus voltages are out of phase, and specifically in which the generator voltage leads the bus voltage by a phase angle less than 90°. The "on" time of each transistor 78 and 88 is equal to the half cycle duration of the input sine wave which for a 60-Hertz signal is equal to 8.333 milliseconds. Since the transistors 78 and 88 are connected in series with the resistor 92 as an AND gate, an output signal or change of potential at collector 88c, and thus at junction 90, occurs only during the time interval when both transistors 78 and 88 are conducting simultaneously. This output voltage waveform at junction point 90 is illustrated in FIG. 2c.

The output voltage appearing at junction 90 is inverted by the transistors 96 and 102, impressed across resistors 108 and 110, and appears at terminals 112 and 114, respectively. The terminal 112 is connected to the differential phase comparator 46 and the terminal 114 is connected to the frequency difference detector 68, as will be discussed in more detail hereinafter. The output voltages of transistors 96 and 102, appearing at terminals 112 and 114, respectively, are illustrated in FIGS. 2d and 2e, respectively.

When the voltages applied to transistors 78 and 88 are in phase during the positive half cycles of the input bus and generator voltages, the transistors provide a very low impedance path between junction 90 and the ground terminal 80. Consequently, substantially the entire current through resistor 92 flows through the series connected transistors 78 and 88 and the junction 90 is effectively clamped to ground potential. Thus, there is substantially no current flow through the parallel paths defined by resistors 98 and 100, and resistors 104 and 106, whereby the transistors 96 and 102 are biased into an "off" or nonconducting condition. As a result, a positive square wave is produced at the collectors of these transistors, and thus at terminals 112 and 114. On the other hand, when the transistors 78 and 88 are not simultaneously conductive, there is no current flow through them, and the current through resistor 92 flows equally through the parallel paths formed by resistors 98 and 100 and resistors 104 and 106, thereby biasing transistors 96 and 102 into an on or conductive state. Consequently, the collectors of these transistors are clamped to the potential of the emitters, i.e., ground potential, and thus the terminals 112 and 114 are clamped to substantially ground potential, as seen in FIGS. 2d and 2e.

It will therefore be apparent that the on time of the transistors 96 and 102 (inverters 42 and 44) is directly proportional to the phase displacement that exists between the generator and bus voltage. This is so because transistors 96 and 102 are on only during periods when transistors 78 and 88 are not simultaneously conductive. Thus, when the generator and bus voltages are exactly in phase, the outputs of inverters 42 and 44 are at a maximum off time (transistors 96 and 102 are nonconductive) which is equal to the duration of one-half cycle of the generator or bus voltage. If the generator voltage is out of phase with the bus voltage, the off time of inverters 42 and 44 is decreased, and continues to decrease with increasing phase deviation between the generator and bus voltages. The off time of inverters 42 and 44 is zero when the generator and bus voltages are exactly 180° out of phase with each other. As the phase deviation between the voltages slips past 180°, the off time of transistors 96 and 102 begins to increase until they are again at a maximum when the bus and generator voltages are once more exactly in phase.

Figure 3:
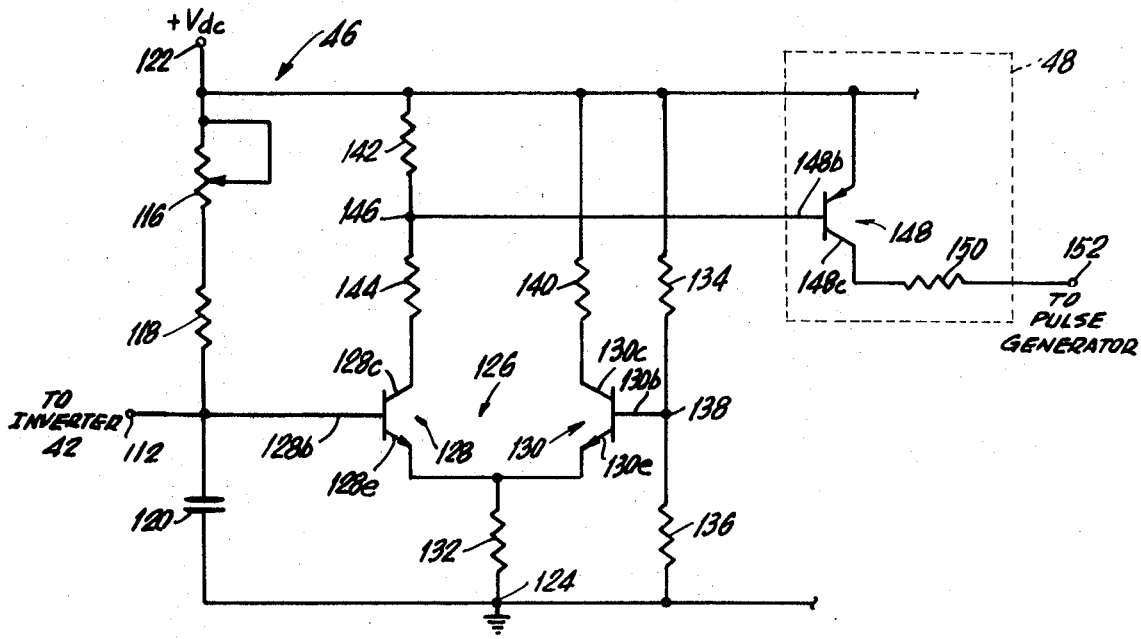
FIG. 3 is a schematic representation of the differential phase comparator and amplifier circuits depicted in block form in FIG. 1.

Referring now to FIG. 3, the differential phase comparator 46 includes the series combination of variable resistor or potentiometer 116, resistor 118 and capacitor 120 connected between a DC voltage source 122 and a ground terminal 124. The junction between resistor 118 and capacitor 120 is connected to the output terminal 112 of inverter 42. The resistors 116 and 118 together with capacitor 120 comprise an extremely stable RC charging network which produces a DC voltage whose peak amplitude is a direct function of the duration of the square wave from inverter 42 (see FIGS. 3a and 3b). The resistors 116 and 118 and capacitor 120 compensate for temperature variations so that the effective RC time constant is substantially independent of normal operating temperature changes.

The phase comparator 46 also includes a differential amplifier 126, including transistors 128 and 130 whose emitters 128e and 130e are connected together and through a resistor 132 to the ground terminal 124. The differential amplifier 126 is very temperature stable and is employed as a voltage detector. Resistors 134 and 136 which are temperature stabilized are connected in series between the DC voltage supply 122 and ground 124, junction 138 between them being connected to the base 130b of transistor 130. The resistors 134 and 136 act as a voltage divider network and determine the reference voltage for the differential amplifier 126. A resistor 140 is connected between source 122 and collector 130c of transistor 130, and a pair of series connected resistors 142 and 144 are connected between source 122 and collector 128c of transistor 128. The junction 146 between the resistors 142 and 144 is connected to the base 148b of a transistor 148 which in conjunction with a resistor 150 connected to the collector 148c of transistor 148 comprises the amplifier 48. The resistor 150 is connected to a terminal 152 which is in turn connected to the pulse generator 50.

FIG. 3a illustrates the output waveform of the inverter 42, and is therefore identical to FIG. 2d. When the transistor 96 of inverter 42 is in an on or conductive state, the capacitor 120 is effectively clamped to ground by virtue of its connection to terminal 112 and is thereby prevented from charging. Thus, the transistor 128 is biased into an off condition and there is no current flow through it. As a result, the potential at junction 146, and thus at base 148b, is equal to that of the supply 122; hence, transistor 148 is rendered nonconductive. When transistor 96 is off, i.e., nonconductive, the capacitor 120 commences to charge, as illustrated in FIG. 3b. If thus bus frequency is 60 Hz., and the oncoming generator frequency is different from 60 Hz., then the width or duration of the square wave available to charge capacitor 120 will vary from zero to 8.333 milliseconds and back to zero. The zero to zero variation occurs for each full Hertz of frequency difference between the bus and oncoming generator voltages.

At the time the generator and bus voltages are exactly 180° out of phase, the capacitor 12 is clamped to ground potential and the time to charge the capacitor is zero milliseconds. However, when the two voltages are exactly in phase, the time to charge capacitor 120 will be at the maximum, i.e., 8.333 milliseconds. The RC time constant of the series connected charging circuit comprising resistors 116 and 118 and capacitor 120 is adjustable by variation of the potentiometer 116. This adjustment is such that the capacitor 120 becomes charged to a sufficiently high potential during this maximum time period (as seen in FIG. 3d) to provide a pulse to the base 128b to render the transistor 128 conductive. When this occurs, the potential at junction 146 and at base 148b decreases, whereby the emitter 148e to base 148b circuit becomes forward biased to render transistor 148 conductive. Consequently, an output pulse is produced at the collector 148c and at the output terminal 152 of the amplifier 48, as shown in FIG. 3e. The leading edge of this pulse corresponds to the desired time in advance of the true in-phase condition of the generator and bus voltages, and in a preferred embodiment of the invention this time is adjustable from 2 to 15 degrees by adjustment of the potentiometer 116. The desired advance time, in degrees, is dependent upon the particular switching mechanism employed to make the parallel connection between the generator and the bus.

Figure 4:
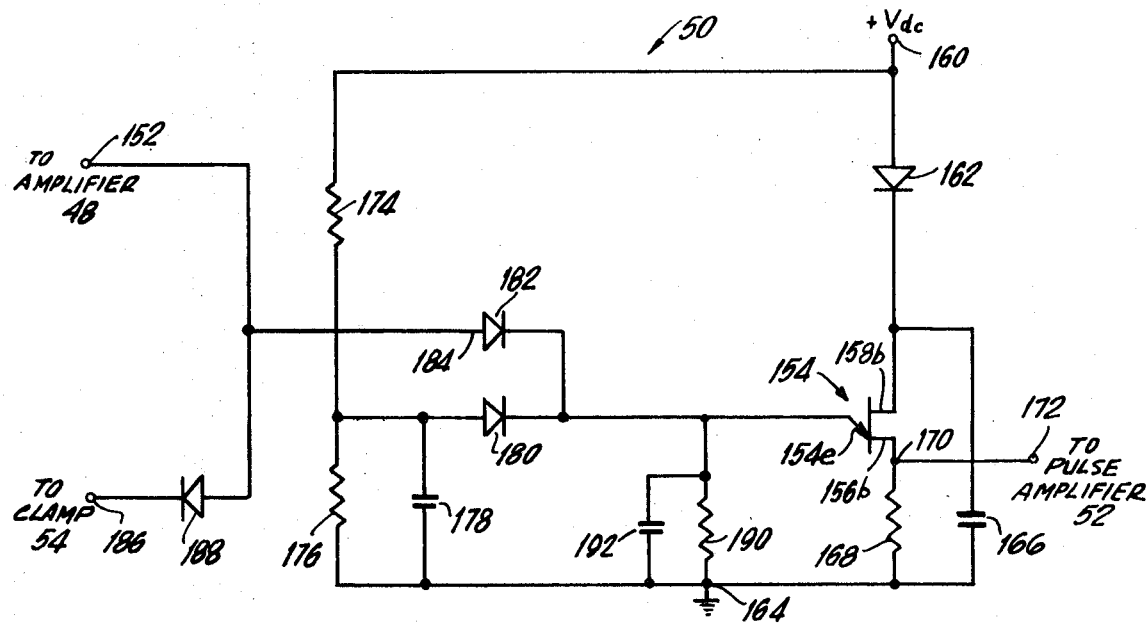
FIG. 4 is a schematic representation of the pulse generator circuit of FIG. 1.

As discussed previously, the output of the amplifier 48 is connected to the pulse generator 50, schematically illustrated in FIG. 4, via terminal 152. The pulse generator 50 includes a unijunction transistor 154 having an emitter 154e, a first base 156b and a second base 158b. The base 158b is connected to a DC voltage source 160 via a diode 162 and to a ground terminal 164 via a capacitor 166. The base 156b is connected to ground terminal 164 via a resistor 168. A junction 170 between resistor 168 and base 156b is connected to an output terminal 172 which is in turn connected to the pulse amplifier 52. A pair of series-connected resistors 174 and 176 are connected between the DC source 160 and the ground terminal 164. A capacitor 178 is connected in parallel across the resistor 176 and through a diode 180 to the emitter 154e. The output terminal 152 of the amplifier 48 is connected through a diode 182 to the emitter 154e.

The pulse generator 50 is required to generate a narrow pulse having a steep leading edge which is coincident in time with the leading edge of the output pulse of amplifier 48 appearing at terminal 152. This is accomplished by discharging capacitor 178 through diode 180, the emitter 154e to base 156b junction of transistor 154, and then through resistor 168 to ground 164.

The resistors 174 and 176 comprise a voltage divider network that initially charges the capacitor 178 to a voltage which is below that required to cause conduction of the transistor 154. However, when a positive pulse appears at the terminal 152, as a result of a corresponding pulse being produced at the output of differential phase comparator 46, this pulse is coupled via diode 182 to the emitter 154e and is added to the potential applied thereto by means of the charge on capacitor 178. The potential then existing on the emitter 154e is sufficient to forward bias the emitter 154e to base 156b junction and cause conduction of transistor 154. The capacitor 178 then discharges through diode 180, transistor 154 and resistor 168 to ground terminal 164, and in so doing produces a positive output pulse across resistor 168 at junction 170 which is coupled to the output terminal 172.

Since it is necessary that the output pulse at terminal 172, signifying a predetermined correlation between the phase angles of the bus and generator voltages, only occur when there is a predetermined correlation of the voltage magnitudes and frequency of the voltages, the anode 184 of the diode 182 is also connected to a terminal 186 through a diode 188, terminal 186 being connected to the clamp circuit 54. The clamp circuit 54 supplies a negative bias voltage to inhibit operation of the pulse generator 50 whenever the frequency and voltage of the bus and generator voltages differ from each other by more than the predetermined limits. More particularly, the diode 188 provides a shunt path of less resistance for the pulse appearing at terminal 152, thereby preventing the pulse amplifier from activating the pulse generator 50 every time the phases of the generator and bus voltages differ from each other by less than a predetermined amount, as will appear more fully hereinafter.

The diode 180 serves to decouple or isolate the capacitor 178 from the input terminal 152, enabling the pulse from amplifier 48 to trigger transistor 154. The diode 162 also acts as a decoupling diode in conjunction with the capacitor 166. In this regard, when a DC potential is present at terminal 160, the capacitor 166 is readily charged through the diode 162. If there is a loss of voltage at terminal 160, it is necessary to prevent the accidental conduction or firing of transistor 154. This is accomplished by virtue of the charge on capacitor 166. When the potential at terminal 160 is no longer present, the voltage on capacitor 166 prevents the transistor 154 from conducting while the capacitor 178 discharges through both resistors 174 and 176, prior to the decrease of potential on capacitor 166 and thus on the base 158b.

The diode 188 interposed between the diode 182 and the terminal 186 connected to clamp circuit 54, serves as a decoupling diode which isolates the pulse generator 50 from the clamp 54 when the latter is in an off condition. It is also desirable to prevent the chance firing of the pulse generator 50 when the clamp 54 is off and the pulse generator is awaiting the first positive pulse from the amplifier 48. This is accomplished by connecting the parallel combination of a resistor 190 and a capacitor 192 between the emitter 154e and the ground terminal 164.

As discussed previously hereinabove, the output of inverter 42, and thus of inverter 44, is a square wave whose positive going portion has a width variable between 0 and 8.333 milliseconds depending on the phase difference between the bus and generator voltages, as illustrated by FIGS. 3a and 3c (with reference to inverter 42). Since the individual square wave outputs of inverters 42 and 44 are occurring at 60 Hz., the sampling of phase information is occurring at the same rate. However, the width variation is also directly related to the frequency difference between the two voltages. Thus, it is possible to extract frequency information from the AND gate 40 via the inverter 44 and to employ this information to prevent paralleling of the bus and generator voltages by inhibiting the activation of the pulse generator 50, whenever the frequency difference between the two voltages is not within prescribed limits.

In this connection, reference is made to FIG. 5, which shows a schematic illustration of the frequency difference detector 68. The detector 68 includes a unijunction transistor 194 whose second base 196 is connected through a resistor 198 to a DC source 200. A series circuit comprising a potentiometer 202, a resistor 204 and a capacitor 206 is connected between the DC source 200 and a ground terminal 208. The junction 210 between resistor 204 and capacitor 206 is connected to the emitter 194e of the transistor 194 and to the output terminal 114 of inverter 44. The first base 212 of transistor 194 is connected through a resistor 214 to the ground terminal 208. The transistor 194 in conjunction with resistor 204, potentiometer 202 and capacitor 206 comprises a relaxation-type oscillator which oscillates, in one particular embodiment of the invention, when the width of the square wave output pulse from inverter 44 supplied thereto exceeds 7.5 milliseconds. However, this time is adjustable by adjustment of the potentiometer 202.

The frequency of the output pulses produced across resistor 214 by virtue of the conduction of transistor 194 is 60 times per second, as long as the phase relationship of the oncoming generator voltage is within ±15° of the bus voltage (inverter 44 output square wave being in excess of 7.5 milliseconds), as indicated in FIGS. 5a and 5b. The positive pulses appearing across resistor 214 are coupled via a series connected diode 216 and resistor 218 to the gate 220 of a small silicon controlled rectifier 222, commonly termed and hereinafter referred to as an SCR. The positive pulses applied to gate 220 cause the SCR 222 to fire and to discharge any potential which may exist on a capacitor 224, one terminal of which is connected to the anode of the SCR and its other terminal being connected to a terminal 225 which is in turn connected to the power supply 62, as will be referred to more fully hereinafter.

The voltage appearing on capacitor 224 is determined by the time constant of its charging circuit comprising the capacitor 224 and the series connection of a resistor 226 and a potentiometer 228 connected between the capacitor and the DC source 200. The terminal of the capacitor 224 connected to resistor 226 is also connected to the emitter 230e of a unijunction transistor 230. When the frequency difference between the bus and generator voltages is higher than the prescribed limits (see FIG. 5a) the capacitor 224 is caused to discharge (FIG. 5c) through the SCR 222 prior to its having charged to a high enough potential to cause breakdown and conduction of the transistor 230. Thus, under these conditions, no pulse (see FIG. 5d) is generated across the resistor 232 connected between the base 234 of transistor 230 and ground terminal 208. The second base 236 is connected through a resistor 238 to the DC source 200.

When the frequency difference between the bus and generator voltages decreases to a point within the prescribed frequency limits, (FIG. 5e), the capacitor 224 charges to a high enough potential (see FIG. 5g) to forward bias the emitter 230e to base 234 circuit to cause conduction of transistor 230. As a result, a positive voltage pulse (FIG. 5h) is generated across resistor 232, which pulse is transmitted through a coupling capacitor 240 and a positive poled diode 242 to an output terminal 244. Terminal 244 is connected to the clamp circuit 54. The positive pulse appearing at terminal 244 unlatches the clamp circuit, as will be discussed hereinafter.

The diode 242 is connected via a resistor 246 to the DC source 200. A diode 248 is connected between the resistor 246 and the cathode of diode 242 to limit the magnitude of the output pulse appearing at terminal 244 to that of the voltage at terminal 200 plus the conducting potential of the diode 248. It is to be noted that the base 212 of transistor 194 is also connected through diode 216 and resistor 218 to a resistor 250 and then to ground 208, the resistors 218 and 250 acting as a voltage divider to supply the proper potential to gate 220 to fire the SCR 222.

The frequency difference detector 68 and, in particular, the charging of capacitor 224 is variable by adjustment of potentiometer 228. The resistors 198 and 238 are employed for temperature compensation, and the resistors 204 and 226 are merely current-limiting resistors. The gate 220 is also connected, via a diode 252 and resistor 254, to a terminal 256 which is connected to the voltage different detector 58. In this way, production of an output pulse across resistor 232 by virtue of conduction of transistor 230 is inhibited by continuously causing SCR 222 to conduct whenever the magnitude of the bus and oncoming generator voltages are not within preselected limits, as will be explained more fully hereinafter.

Figure 6:
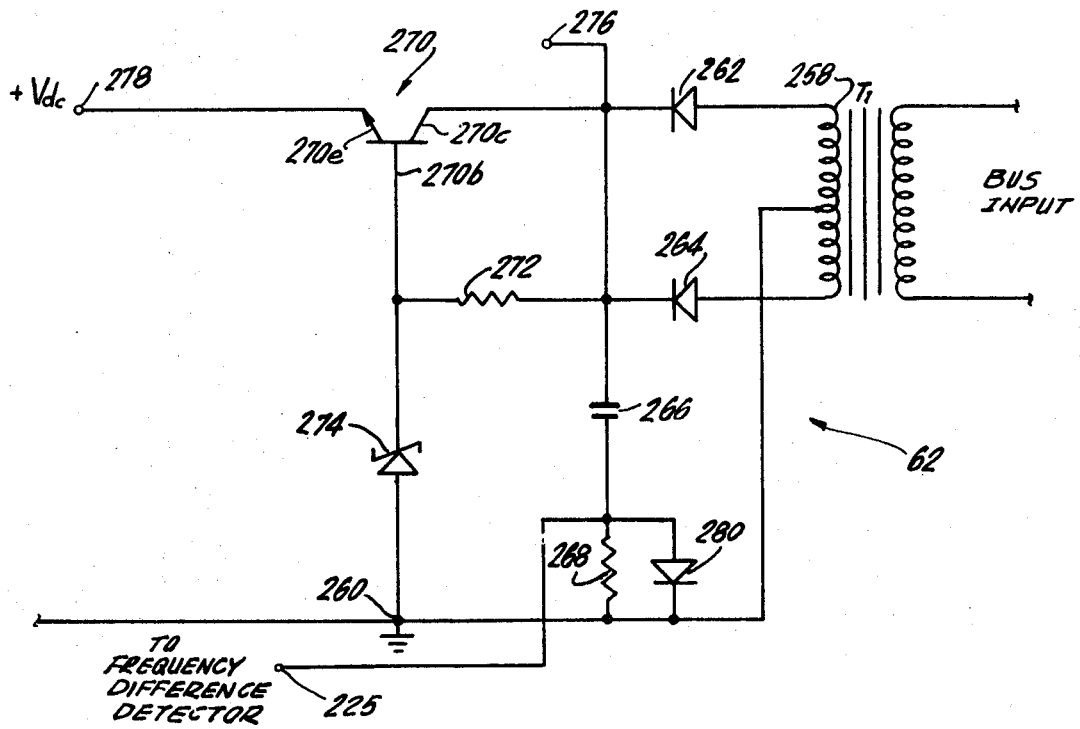
FIG. 6 is a schematic representation of the power supply of FIG. 1 and an associated regulator.

Referring now to FIG. 6, there is shown a schematic representation of the power supply 62. The power supply comprises the transformer $T_1$ having a primary winding connected to the bus input and a center-tapped secondary winding 258 connected to a ground terminal 260. The power supply is of the conventional full-wave rectifier type, and includes diodes 262 and 264 connected to the ends of secondary winding 258. The cathodes of diodes 262 and 264 are connected together and through the series combination of a filtering capacitor 266 and a resistor 268 to ground terminal 260. The output of the rectifier, i.e., the diodes 262 and 264, is fed to the collector 270c of a voltage regulating transistor 270, and also through a resistor 272 to the base 270b of the transistor. The base 270b is connected through a zener diode 274, serving as a voltage reference, to ground 260.

In the operation of the power supply 62, a rectified and filtered but unregulated bus voltage is obtained across the capacitor 266 and appears at the terminal 276, the purpose of which will be discussed hereinafter. Similarly, a rectified, filtered, and regulated DC voltage is produced at the emitter 270e and appears at the terminal 278. It is this voltage appearing at terminal 278 which is connected to the various DC voltage source terminals mentioned previously and to be mentioned hereinafter. The voltage appearing across resistor 268 is fed to the terminal 225 which is connected to one terminal of the capacitor 224 in the frequency difference detector 68. This voltage is used to pulse the capacitor 224 to insure the availability of sufficient peak current for forward biasing, and thus conduction of, the transistor 230.

Connected in parallel across resistor 268 is a diode 280 which limits the voltage drop appearing across resistor 268 to the rating of the diode (in one embodiment 1.0 volt) which voltage has a tendency to exceed this rating when the power supply is first turned on and the filter capacitor 266 is accepting its initial charge.

With reference to FIG. 7, there is shown the schematic circuit representation of the voltage difference detector 58. The rectified and filtered bus voltage appearing at the terminal 276 (see also FIG. 6) is impressed across the resistors 282 and 284 connected in series between the terminal 276 and a ground terminal 286. The junction between the resistors 282 and 284 is connected to the base 288b of a transistor 288. The resistors 282 and 284 act as a voltage divider which sets a reference voltage at the base 288b. A filter capacitor 289 is connected in parallel across the resistor 284. The emitter 288e is connected in common with the emitters 290e and 292e of transistors 290 and 292, respectively, which transistors are connected in a differential amplifier configuration. The emitter 288e, 290e and 292e are all connected to ground terminal 286 through a resistor 294. The voltage appearing at emitter 288e serves as the reference potential for the comparison function of transistors 288, 290 and 292.

The generator input voltage is transformed by transformer $T_2$ whose secondary winding 296 is connected to a full-wave rectifying and filtering network comprising the diodes 298 and 300 and capacitors 302 and 304 connected in a conventional manner. The rectified and filtered generator input voltage is impressed across a complex voltage divider, as will be discussed immediately hereinafter, to provide the proper reference voltages to the bases 290b and 292b, as described hereinafter.

The complex voltage divider network is designed to provide two separate and adjustable voltage reference levels. The voltage divider comprises a resistor 306 connected between the diode 298 and capacitor 304, resistors 308, 310 and 312, a three sectioned potentiometer having sections 314A, 314B, and 314C, and a single section potentiometer 316. All of these elements are effectively connected between (a) the junction between resistor 306 and capacitor 304 and (b) the ground terminal 286.

Clockwise rotation of the potentiometer sections 314A, 314B and 314C, rotates the center arms, as indicated by the small vertically disposed arrows in FIG. 7. This rotation serves to increase the voltage differential setting of the detector 58 by increasing its upper limit and decreasing its lower limit (as seen in FIG. 7a). This is accomplished by producing a higher voltage tap on potentiometer section 314A and a lower voltage tap on the section 314B, which voltages are reflected as higher and lower voltage inputs to the bases 290b and 292b of the transistors 290 and 292, respectively, the inputs being coupled to these bases by resistors 318 and 320, respectively. The potentiometer section 314C is utilized to compensate the divider network so that both the upper and lower voltage reference points track equally well, from a voltage percentage standpoint, from the median reference voltage at the base 288b. This compensating feature is a prerequisite for proper operation of the detector 58 since the upward movement of the slider of potentiometer section 314A causes loading effect upon the divider network. The potentiometer 316 is provided for purposes of internal adjustment of the detector.

When a bus voltage input is present, a voltage directly related to it is present at terminal 276 and thus at the base 288b. The collector 288c is connected to DC source 322 via a resistor 324. The voltage at base 288b causes conduction of transistor 288 resulting in a voltage appearing at emitter 288e, and thus at emitters 290e and 292e, which serves as a reference voltage for comparison of the input voltages applied to the bases 290b and 292b.

When potentiometer 314A is set at a nominal differential percentage, in one embodiment ±10 percent, and in the absence of a generator input voltage to the primary coil of transformer $T_2$, both transistors 290 and 292 are biased in an off condition. Similarly, transistors 326 and 328 are maintained in an off condition. A transistor 330, connected as shown, is biased into a conducting state when transistor 328 is off by virtue of the connection of its base 330b to ground terminal 286 through a resistor 332. When transistor 330 conducts, there is a maximum positive voltage at its collector 330c which is connected to output terminals 256 and 334. These terminals are connected to the frequency difference detector 68 and the clamp circuit 54, respectively, causing an inhibit pulse (as seen in FIG. 7b) to be applied to both the detector 68 and the clamp circuit 54, thereby preventing actuation thereof. However, when a generator voltage is present, a portion of it appears across capacitor 304. Increase of the generator voltage, to a value approximately 10 percent below that of the bus voltage, causes condition of the transistor 290 and flow of current to the collector 290c through a collector resistor 336, whereupon transistor 328 conducts. As a result, the base 330b and emitter 330e are at substantially the same potential and this circuit is clamped off causing the transistor 330 to cease conduction. Consequently, the voltage at collector 330c falls to substantially ground potential at which time the generator voltage has increased beyond the lower reference voltage point. The lack of potential at collector 330c removes the inhibit signal appearing at terminals 256 and 334 to permit actuation of the frequency difference detector 68, as discussed previously, and to permit the unlatching of the clamp circuit 54.

As the generator voltage increases further, it attains a value which is approximately 10 percent above that of the bus voltage. At this time a sufficiently high voltage is impressed upon the base 292b via resistor 320 to turn on transistor 292 and cause collector current to flow through the collector resistor 338. In consequence, transistor 326 commences conducting and clamps the base to emitter circuit of transistor 328 off, ceasing its conduction, even though transistor 290 is still conducting. When transistor 328 is turned off, transistor 330 is immediately turned on due to the fact that the base drive is constantly being supplied via the current flow through resistor 332. When this occurs, the collector 330c again rises to a maximum voltage to provide an inhibit signal to be applied to the frequency difference detector 68 and clamp circuit 54 via the terminals 256 and 334, respectively. Of course, a subsequent decrease of the generator input voltage places it within the desired differential whereupon the detector 58 is once more operative in the manner discussed previously.

The upper and lower voltage reference levels are not static and arbitrary but percentages of the actual bus voltage and variable in accordance with the latter. Thus, as the bus voltage varies, the reference voltage appearing at the emitter 288e varies correspondingly to cause the upper and lower voltage reference levels to track the actual bus reference voltage. The common emitter arrangement of emitters 288e, 290e and 292e minimizes the effect of temperature variations upon the upper and lower voltage reference levels, the effect being substantially the same as in a conventional differential amplifier. By way of illustration, when the base to emitter voltages of the transistors 290 and 292 decrease due to an increase in the ambient temperature, the base to emitter voltage of transistor 288 decreases by a substantially equal amount to thereby maintain the upper and lower voltage reference levels constant.

The single stage potentiometer is employed to initially adjust the detector 58 circuitry so that the midpoint of the upper and lower voltage reference band is coincident with the value of the bus voltage. This permits equal positive and negative deviations from the reference bus voltage and also permits compensation for the variation in values of the various circuit components.

Figure 8:
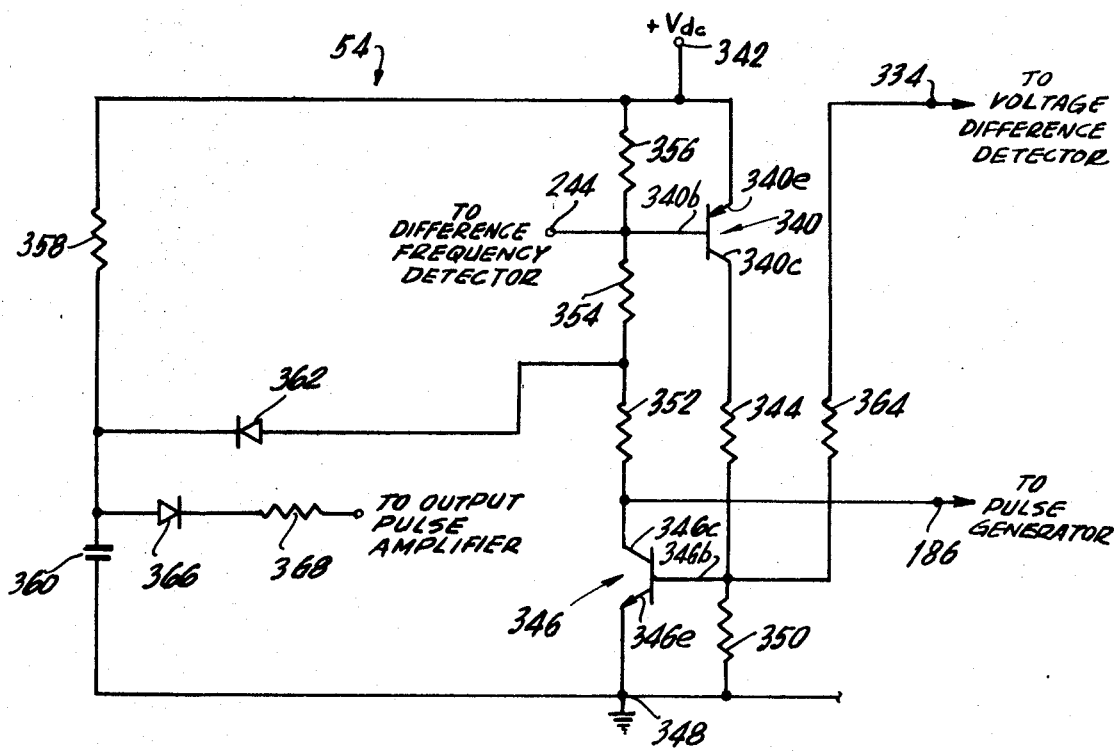
FIG. 8 is a schematic representation of the clamp circuitry of FIG. 1.

Referring now to FIG. 8, there is shown a detailed schematic representation of the clamp circuit 54. A signal at the terminal 186, connected to the pulse generator 50, serves to inhibit the operation of the pulse generator whenever the clamp circuit is in an on condition, as will be explained hereinafter. Basically the clamp circuit is a complementary flip-flop which can be turned on or off by different inputs to it. The clamp circuit includes a transistor 340 whose emitter 340e is connected to a DC source 342 and whose collector 340c is connected via a resistor 344 to the base 346b of another transistor 346. Transistors 340 and 346 are complementary transistors. The emitter 346e of transistor 346 is connected directly to a ground terminal 348, and its base 346b is connected directly to the ground terminal through a resistor 350. The collector 346c is connected via the series combination of resistors 352 and 354 to the base 340b which is in turn connected to the DC source 342 via a resistor 356. The source 342 is also connected via the series combination of a resistor 358 and capacitor 360 to the ground terminal 348. The junction between resistors 352 and 354 is connected via a positively poled diode 362 to the junction between resistor 358 and capacitor 360.

When the monitor 30 is first turned on, it is essential that no output pulse be accidentally produced, since such a pulse would falsely trigger the paralleling mechanism. Thus, when power is first applied to the monitor 30, the power supply 62 immediately rises to its normal operating potential. However, capacitor 360 cannot charge instantaneously. The initial charge path is from the terminal 342 through the emitter to base junction of transistor 340, resistor 354, diode 362 to capacitor 360. Current flow through the above path causes transistor 340 to turn on following which transistor 346 turns on. When both transistors 340 and 346 are on, no trigger pulse from the amplifier 48 can be applied to the pulse generator 50. More particularly, when transistor 346 is conducting, its collector 346c is substantially clamped to ground potential causing the pulse appearing at the output terminal 152 of the phase comparator amplifier 48 to be shunted through the diode 188 to ground.

Unlatching of the complementary flip-flop, comprising the transistors 340 and 346, is achieved only by the appearance of a positive trigger pulse from the frequency difference detector 68 at terminal 244. When a positive pulse is present at terminal 244, signifying that the frequency differential between the bus and generator voltages is within the prescribed limits as described previously, the pulse is applied to base 340b and the transistor 340 is turned off. Thereafter, the next succeeding positive pulse appearing at the output terminal 152 of the output amplifier 48 of the differential phase comparator 46 will trigger the pulse generator 50, provided that transistor 346 is also turned off.

The flip-flop is also maintained in an on condition by the positive output appearing at the output terminal 334 of the voltage difference detector 58, which is coupled via a resistor 36 to the base 346b to supply constant drive to the transistor 346. Thus, whenever transistor 330 of the voltage difference detector 58 is on, the transistor 346 and thus the flip-flop is on. When the voltage appearing at terminal 334 is substantially at ground potential, indicating that the voltages of the bus and generator are within the prescribed limits, and a positive voltage pulse appears at terminal 244, indicating that the difference frequency of the two voltages is within the prescribed limits, the flip-flop is turned off by turning off both of the complementary transistors 340 and 346. This unlatches the clamping circuit 54, whereupon the next pulse from the amplifier 48 of the differential phase comparator 46 triggers the pulse generator 50 and starts the ultimate parallel switching operation.

Although initial charging of capacitor 360 occurs through resistor 354, the ultimate charging of the capacitor occurs via the resistor 358. When the capacitor has charged to the potential of the DC supply at terminal 342, it is decoupled from the flip-flop portion of the clamp circuit by the diode 362 so that it can no longer have any effect. However, whenever the pulse amplifier 52 is turned on, as will be described hereinafter, the capacitor 360 is immediately discharged via a diode 366, and a resistor 368. This causes the flip-flop to revert to its clamped or latched condition wherein the transistors 340 and 346 are once more turned on. This insures that no more than one pulse will be applied to the pulse generator 50 when all parameters are within their prescribed limits.

The resistors 350 and 356 are conventional stabilization resistors, while the resistors 344, 352, and 354 are collector load resistors. The resistor 368 is a current-limiting resistor, while the diode 366 serves to decouple the pulse amplifier 52 from the clamp circuit 54 after the amplifier 52 turns off.

Figure 9:
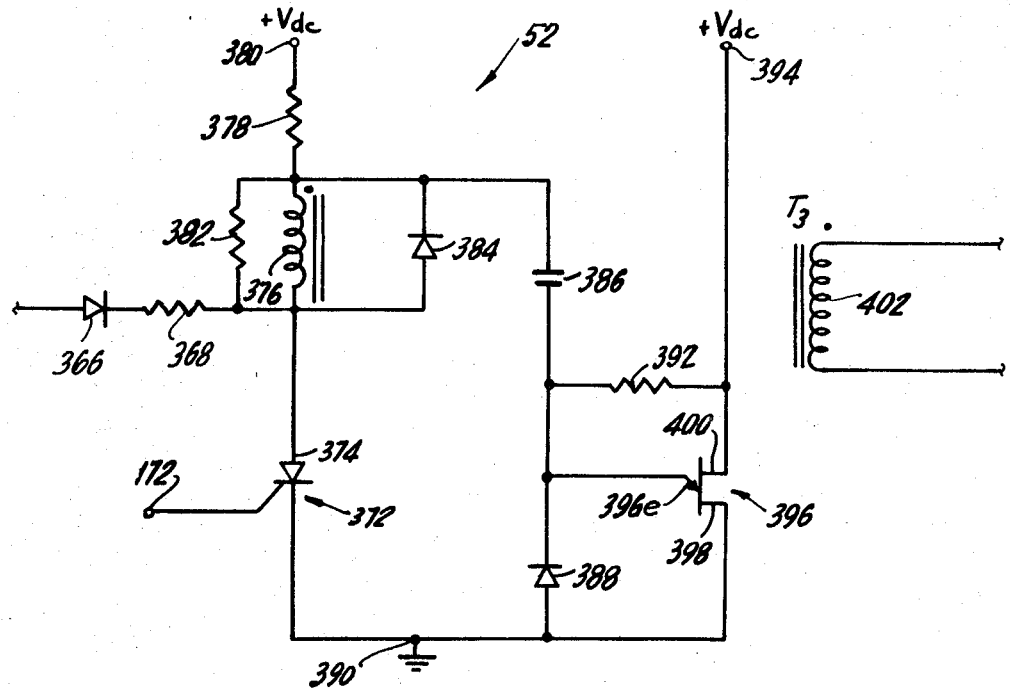
FIG. 9 is a schematic representation of the pulse amplifier of FIG. 1.

A schematic illustration of the pulse amplifier 52 of the present invention is shown in FIG. 9. The pulse generator 50 will in many cases generate a pulse of sufficient magnitude to trigger simple output circuits comprising a simple SCR having for example, a DC type circuit breaker in its anode circuit, and could employ a simple reset switch connected in series in the anode circuit. However, when large output SCR's are required, it is necessary to insure proper hard firing of such an SCR. For this purpose, the synchronizing monitor of the present invention incorporates the pulse amplifier 52.

The amplifier 52 includes a small SCR 372 whose anode 374 is connected through the series combination of the primary coil 376 of a transformer T₃ and a resistor 378 to a DC source 380. Connected in parallel across the coil 376 are a resistor 382 and a diode 384. The junction between coil 376 and resistor 378 is connected, via a capacitor 386 and a negatively poled diode 388 to a ground terminal 390. The junction between capacitor 386 and diode 388 is connected via a resistor 392 to another DC source 394, and also to the emitter 396e of a unijunction transistor 396. The first base 398 of this transistor is connected directly to the ground terminal 390, and the second base 400 is connected to the DC source 394.

The SCR 372 is normally in an off or nonconducting condition. The capacitor 386 is normally charged to a positive potential by the flow of current from the source 380, through resistor 378, and the emitter 396e to base 398 circuit of transistor 396, to ground terminal 390. At this time the output across the secondary coil 402 of transformer T₃ is zero volts.

When a pulse appears at the output terminal 172 of the pulse generator 50, it immediately triggers the SCR 372 causing conduction through the latter, and causing the voltage at the anode 374 thereof to decrease to substantially ground potential. Current flow for the continued conduction of SCR 372 is supplied via the series connection of resistors 378 and 382 to the DC source 380. With the SCR 372 in a conductive state, the capacitor 386 discharges through the primary coil 376, the SCR 372, and the diode 388. The discharge of capacitor 386 through the primary coil 376 generates a fast rise time voltage pulse across the coil which is transformed and causes a magnified voltage pulse to appear across the secondary coil 402 of the transformer T₃. After discharge of capacitor 386, the voltage across primary coil 376 collapses and causes a reverse voltage to appear across that coil, the reverse voltage being shunted by means of diode 384 so as to prevent any large negative pulse from appearing across secondary coil 402.

Subsequent to the conduction of SCR 372 and discharge of capacitor 386, the capacitor 386 is charged to an opposite polarity by the DC source 394 via resistor 392. Thus, the terminal of capacitor 386 connected to emitter 396e charges to a positive potential which, when it exceeds the breakdown potential of transistor 396, forward biases the emitter 396e to base 398 junction causing the transistor 396 to conduct. As a result, a negative voltage pulse is coupled via the diode 384 to the anode 374 of SCR 372, decreasing the potential at anode 374 to a negative value to thereby back bias the SCR 372 and turn it off.

Resetting of the pulse amplifier is automatic since it takes approximately 70 to 100 milliseconds for the transistor 396 to conduct after the SCR 372 has been triggered on, the resetting time being controlled by the selection of the resistance value of resistor 392. The capacitor 386 serves the dual function of supplying the output pulse power upon triggering of the SCR 372, and supplying the reset power to back bias SCR 372 to turn the latter off.

When a high-speed contactor is employed as the paralleling mechanism, as will be described hereinafter, it is necessary to employ a stored energy module to translate the pulse generated by the monitor 30 into an energy pulse which will slam a high speed contactor closed. A schematic representation of a stored energy module 56 employed for this purpose is depicted in FIG. 10. The stored energy module 56 comprises a transformer T₄ and a rectifier including diodes 404, 406, 408, and 410 connected through a series limiting and charging resistor 412 across a charging capacitor 414. A low-voltage-inhibiting circuit comprises the series connection of a zener diode 416, a potentiometer 418, and the coil 420 of a reed relay 422. The module 56 also includes an SCR 424 which serves as an output switching device. In this connection, one terminal 426 of a high-speed contactor is connected to capacitor 414, and the other terminal 428 of the contactor is connected to the anode 430 of SCR 424. The cathode 432 of the SCR 424 is directly connected to a ground terminal 434, while the gate 436 thereof is connected to the ground terminal via a resistor 438. Gate 436 is also connected to the output of the monitor 30 (output of pulse amplifier 52) through the contacts 440 and 442 of switch 422 and a coaxial cable connector 444. The outer conductor of the cable 444 is connected to the ground terminal 434. Connected across the SCR 424 in parallel therewith is the series connection of a capacitor 446 and a resistor 448.

The low voltage inhibit circuit, comprising zener diode 416, potentiometer 418, and relay coil 420, serves to prevent the monitor output from triggering the SCR 424 if, by some chance, the magnitude of the bus input voltage to transformer $T_4$ is insufficient to maintain a significant enough voltage across capacitor 414 to enable it to properly activate the high speed contactor. In particular, the zener diode 416 serves as a voltage reference and potentiometer 418 provides adjustable current control for the pull-in voltage of the relay 422. The capacitor 446 and resistor 448 provide $dv/dt$ protection for the SCR 424, whereby closure of an externally located defeat switch in series with the high-speed contactor will not affect the SCR.

When a sufficient potential exists across capacitor 414 and a positive voltage pulse is applied to the gate 436 from the monitor 30, the SCR 424 is triggered on and the voltage across capacitor 414 activates the contactor which remains closed until otherwise interrupted. Interruption of the high-speed contactor serves to reset the SCR 424.

As discussed hereinbefore, the monitor 30 need not necessarily include a pulse amplifier 52 and a stored energy module 56. All that is required is a simple SCR circuit driven directly by the output pulse produced by the pulse generator 50. This type of output device is suitable for certain DC type circuit breakers but the pulse energy of the pulse generator restricts this type of output stage to smaller size SCR's.

Another type of output stage which can be employed with the monitor 30 is a relay output, and this is illustrated in FIG. 11. When using the relay output, the stored energy module 56 is not required and the pulse amplifier 52 is slightly modified. In this instance, the transformer $T_3$ of the pulse amplifier is replaced by a conventional small relay 450 (FIG. 11). When the SCR 372 (FIG. 9) is energized, the relay 450 becomes energized and remains so until the capacitor 386 is recharged through resistor 392, whereupon the transistor 396 is forward biased into conduction and the SCR 372 is turned off to thereby deenergize the relay 450. When relay 450 is energized, current flows from the bus through a closed defeat switch 452 and the energizing coil 454 of a circuit breaker 456, having three sets of contacts 458, 460 and 462, to effect closure of the breaker. The relay 450 remains energized for a sufficient period of time to initiate the required paralleling action, normally of the order of 75 to 100 milliseconds. This time period is adjustable by adjustment of the value of resistor 392. In this type of application, a greater phase advance is required in order to compensate for slower closure times of the associated control relay and circuit breaker.

Referring now to FIG. 12, there is shown the connection of the synchronizing monitor to a high-speed contactor, generally designated by the reference numeral 464. The high-speed contactor is designed to close within 1 cycle of a 60 Hz. signal, i.e., within 17 milliseconds or less. This permits the phase band or phase deviation between the bus and generator voltages to be held between very narrow predescribed limits, e.g., ±2°.

The high-speed contactor 464 is a normally open three-pole single-throw magnetically held device having a high inrush current rating and includes a coil 466 connected across the terminals 426 and 428 (FIG. 10). The contactor also includes pairs of contacts 468, 470, and 472. When a pulse appears across the terminals 426 and 428, coil 466 is energized and causes the contacts 468, 470, and 472 to close, thereby paralleling the generator with the bus. Simultaneously, an auxiliary contact 474 is closed ans supplies current to the coil 476 of a main contactor 478, having contact terminals 480, 482 and 484, from the terminals 486 and 488 of a main power supply. Current flow through coil 476 effects closure of the contacts 480, 482, and 484.

Once the main contactor 478 closes, there is no longer any need to retain the high-speed contactor 464 in an energized state and the latter is therefore deenergized by means of a high-speed disconnect switch or relay 490 connected in circuit with the coil 466. The high-speed disconnect 490 opens a predetermined period of time after energization of high-speed contactor 464, so that if the main contactor 478 fails to become energized, the high-speed contactor 464 will be deenergized to disconnect the oncoming generator from the bus. This mode of operation is sometimes necessary since the high-speed contactor 464 ordinarily does not have a steady state current capacity comparable to that of the main contactor. However, the high-speed contactor should have the necessary interrupt capacity to enable it to disconnect the generator from the bus should no other means, such as associated circuit breakers, be available to disconnect the generator. Of course, the high-speed contactor 464 could be replaced by solid state components. When such components are employed, a stored energy module may not be required.

In summary the operation of the synchronizing monitor 30 is as follows:
1. When the bus input voltage is present, the power supply of both the monitor 30, and the stored energy module 56 are energized.
2. The capacitor 414 in stored energy module 56 immediately commences charging to its critical value, whereupon the relay 422 becomes energized enabling the module to close the high-speed contactor 464 upon the application of a proper input pulse to the module.
3. Since, at this time, there is no generator voltage input to the monitor 30, the voltage difference detector 58 causes the clamp circuit 54 to operate in its inhibit mode. However, even if a generator voltage were present as a proper input to the monitor, the clamp circuit would be in an inhibit mode since the capacitor 360 would have switched the clamp circuit into this mode of operation as the power supply 62 was rising to its regulated value.
4. After the generator voltage has been applied as an input to the monitor 30, several effects occur almost simultaneously:
   a. Firstly, the input AND gate 40 supplies a varying time duration square wave input to both inverters 42 and 44, whereupon a signal is generated by the phase comparator 46 which is representative of the phase relationship between the oncoming generator and bus voltages. The signal is supplied to pulse generator 50 after amplification by the amplifier 48. However, the operation of pulse generator 50 is inhibited by virtue of the clamped or latched condition of the clamp circuit 54 connected thereto;
   b. Secondly, the voltage difference detector 58 commences sampling the voltage difference between the generator and bus voltages. When the voltage differential is outside the prescribed limits, a continuous inhibit signal is generated by the detector 58 and fed to the clamp circuit 54 to prevent unlatching of the latter, and the frequency difference detector 68 so as to prevent sampling of the difference frequency. However, when the voltage differential is within the prescribed limits, the inhibit signal supplied by detector 58 to clamp 54 and frequency difference detector 68 ceases and the clamp circuit is in proper operating condition to receive a pulse from the frequency difference detector 68 which will turn off or unlatch the clamp circuit 54; and
   c. Thirdly, the frequency difference detector 68 starts to sample the frequency difference between the generator and bus voltages once the voltage difference is within prescribed limits. If the generator frequency does not come within the prescribed frequency differential, no output pulse is produced by the detector 68. When, however, the frequency of the oncoming generator is within the prescribed limits, a pulse is produced by detector 68 which is fed to the clamp circuit 54 turning it off. As a result, the clamp circuit is unlatched, whereby the next succeeding pulse produced by the phase compacitor 46, amplified by 48 and fed to the pulse generator 50, triggers the latter. The output pulse may or may not thereafter be amplified, to active the output state, amplification of the pulse being dependent upon the particular type of output stage employed, as was mentioned above.

5. In the embodiment illustrated in FIG. 1, when the output stage (pulse amplifier 52) is energized, the clamp circuit 54 is switched back into its on or latched state. Thereafter, when the bus and generator voltages have been paralleled, there is no possibility of an unlatching pulse being produced by the frequency difference detector 68, since the bus and generator frequency is now the same and there no longer exists any possibility of a frequency difference.

It is thus seen that the invention provides a switching apparatus for connecting two separate AC sources in parallel, when their phase, frequency, and voltage characteristics are substantially equal, by means of an automatic synchronizing monitor. The monitor activates the switching mechanism when the relationship between the phase, frequency, and voltage characteristics of the AC sources are within predetermined limits calculated to compensate for the actual closure time of the switching apparatus after its initial activation.

The invention has been shown and described in preferred form only, and by way of example, and many variations may be made in the invention which will still be comprised within its spirit. It is understood, therefore, that the invention is now limited to any specific form or embodiment except insofar as such limitations are included in the appended claims.

What is claimed is:

1. An automatic synchronizing monitor for connecting one AC source in parallel with another AC source when the phase, frequency, and voltage of said one source are substantially equal to the phase, frequency, and voltage, respectively, of said other source, said monitor comprising:

means for connecting said sources as inputs to said monitor,
output switching means to enable the parallel connection of said sources,
a pulse generator operatively connected to said output switching means,
inhibiting means connected to said pulse generator for inhibiting operation of the latter,
means for comparing the phase angle difference between said sources and for supplying a signal to said pulse generator to active the latter only when said phase angle difference is within predetermined limits,
means for comparing the frequency differential between said sources and for supplying a signal to said inhibiting means only when said frequency differential is within predetermined limits, and
means for comparing the voltage magnitude differential between said sources and for supplying a signal to said inhibiting means only when said voltage magnitude differential is within predetermined limits,
said inhibiting means being operative only upon the reception of simultaneous signals from said frequency and voltage magnitude comparing means to discontinue inhibiting said pulse generator and permit the latter to produce a signal in response to receipt of a signal from said phase-comparing means, said pulse generator signal serving to activate said output switching means to thereby connect said sources for parallel operation.

2. An automatic synchronizing monitor in accordance with claim 1, wherein said pulse generator supplies an activating signal to said switching means in advance of the true in phase condition of said sources, whereby connection of said sources for parallel operation occurs at said true in phase condition.

3. An automatic synchronizing monitor in accordance with claim 1, including a pulse amplifier connected to the output of said pulse generator.

4. An automatic synchronizing monitor in accordance with claim 3, including stored energy module connected to the output of said pulse amplifier.

5. An automatic synchronizing monitor in accordance with claim 1, wherein said phase-comparing means comprises a gate circuit, and said gate circuit having said sources connected as inputs thereto, the output of said gate being connected to said phase comparator, and the output of said phase comparator being connected to the input of said pulse generator.

6. An automatic synchronizing monitor in accordance with claim 5, including a first inverter circuit between said gate circuit and said phase comparator circuit.

7. An automatic synchronizing monitor in accordance with claim 5, wherein said frequency comparing means comprises a frequency difference detector, the output of said gate circuit being connected to the input of said frequency difference detector, and the output of said frequency difference detector being connected to said inhibiting means.

8. An automatic synchronizing monitor in accordance with claim 7, including a second inverter circuit between said gate circuit and said frequency difference detector.

9. An automatic synchronizing monitor in accordance with claim 7, wherein said voltage comparing means comprises a voltage difference detector, said voltage difference detector having said sources connected as inputs thereto, and the output of said voltage difference detector being connected to said inhibiting means.

10. An automatic synchronizing monitor in accordance with claim 9, wherein the output of said voltage difference detector is also connected to said frequency difference detector.

11. An automatic synchronizing monitor in accordance with claim 9, wherein said voltage difference detector includes means to provide an output signal when the voltage of one of said sources is within prescribed percentage limits of the voltage of the other of said sources.

12. An automatic synchronizing monitor in accordance with claim 9, wherein said gate is an AND gate and is operable to provide a time duration signal to said first and second inverters which is indicative of the time said sources are in phase with respect to each another.

13. An automatic synchronizing monitor in accordance with claim 9, wherein said inhibiting means comprises a clamp circuit, said clamp circuit being effectively connected to the input of said pulse generator, said clamp circuit in the absence of signals thereto from said frequency difference detector and said voltage difference detector providing a shunt path for the signal from said differential phase comparator to thereby inhibit the operation of said pulse generator.

14. An automatic synchronizing monitor in accordance with claim 13, wherein the output of said voltage difference detector is also connected to said frequency difference detector, and said frequency difference detector is operative to provide a signal to said clamp circuit only when said voltage difference detector supplies an output signal thereto which is indicative of the difference in magnitude between the voltages of said sources being within said prescribed limits.

15. An automatic synchronizing monitor in accordance with claim 13, wherein said output switching means comprises a relay, and a circuit breaker, said relay being operative to close said circuit breaker upon the reception of an output signal from said pulse generator.

16. An automatic synchronizing monitor in accordance with claim 13, wherein said output switching means comprises an SCR, and a circuit breaker, said SCR being operative upon the reception of an output signal from said pulse generator to close said circuit breaker.

17. An automatic synchronizing monitor in accordance with claim 13, wherein said pulse generator is connected to said clamp circuit and is operative to supply a pulse to said clamp circuit to return it to its inhibiting mode of operation whereby said clamp circuit again inhibits operation of said pulse generator.

18. An automatic synchronizing monitor in accordance with claim 13, wherein said output activating means includes a stored energy module.

19. An automatic synchronizing monitor in accordance with claim 18, wherein said output switching means comprises a high-speed contactor in conjunction with a main contactor, said high-speed contactor being effective upon the reception of an output pulse from said stored energy module to effect the speedy closure of said high-speed contactor, to thereby connect said first and second sources for parallel operation.